United States Patent
Hall et al.

(10) Patent No.: US 9,497,677 B2
(45) Date of Patent: Nov. 15, 2016

(54) APPLICATION SERVICE PLATFORM WITH ACCESS TO CORE NETWORK INFORMATION

(71) Applicant: Telefonaktiebolaget L M Ericsson (publ), Stockholm (SE)

(72) Inventors: Göran Hall, Mölndal (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/413,129

(22) PCT Filed: Oct. 15, 2012

(86) PCT No.: PCT/EP2012/070397
§ 371 (c)(1),
(2) Date: Jan. 6, 2015

(87) PCT Pub. No.: WO2014/008956
PCT Pub. Date: Jan. 16, 2014

(65) Prior Publication Data
US 2015/0163617 A1    Jun. 11, 2015

Related U.S. Application Data (60) Provisional application No. 61/669,750, filed on Jul. 10, 2012.

(51) Int. Cl.
*H04W 88/08*    (2009.01)
*H04W 36/12*    (2009.01)
(Continued)

(52) U.S. Cl.
CPC .......... *H04W 36/12* (2013.01); *H04L 12/4633* (2013.01); *H04L 67/10* (2013.01);
(Continued)

(58) Field of Classification Search
CPC    H04W 36/0033; H04W 88/08; H04W 80/04
USPC .......... 455/414.1, 422.1, 434, 446, 448, 449
See application file for complete search history.

(56) References Cited

U.S. PATENT DOCUMENTS 8,125,939 B2    2/2012    Murasawa et al.
8,514,756 B1    8/2013    Ramachandra et al.
(Continued)

FOREIGN PATENT DOCUMENTS

EP    1701516 A1    9/2006
EP    1708423 A1    10/2006
(Continued)

OTHER PUBLICATIONS

3GPP, "3rd Generation Partnership Project; Technical Specification Group Services and System Aspects; IP Multimedia Subsystem (IMS); Stage 2 (Release 11)", 3GPP TS 23.228 V11.5.0, Jun. 2012, 1-288.
(Continued)

*Primary Examiner* — Kevin Kim
(74) *Attorney, Agent, or Firm* — Murphy, Bilak & Homiller, PLLC (57) ABSTRACT

A telecommunications network which is accessible to a user equipment (10) via an access node (110). The access node (110) is connected to a gateway node (120). The gateway node (120) may be co-located with the access node (110). At the access node (110), an application service platform (150) is provided for supporting one or more application services which are accessible to the user equipment (10) via the access node (110). For allowing efficient provision of core network information to the application service platform (150), an association is created between first context data of the user equipment (10) as available in the access node (110) and second context data of the user equipment (10) as available in the gateway node (120). Using the association, information from the first context data and the second context data are provided to the application service platform (150).

21 Claims, 7 Drawing Sheets

(51) Int. Cl.

| | | |
|---|---|---|
| *H04W 4/20* | (2009.01) | |
| *H04W 36/00* | (2009.01) | |
| *H04W 4/00* | (2009.01) | |
| *H04M 1/725* | (2006.01) | |
| *H04L 12/46* | (2006.01) | |
| *H04L 29/08* | (2006.01) | |
| *H04W 36/18* | (2009.01) | |
| *H04W 88/16* | (2009.01) | |

(52) U.S. Cl.
CPC ......... *H04M1/72522* (2013.01); *H04W 4/003* (2013.01); *H04W 4/20* (2013.01); *H04W 36/0033* (2013.01); *H04W 36/0044* (2013.01); *H04W 36/18* (2013.01); *H04W 88/08* (2013.01); *H04W 88/16* (2013.01)

(56) References Cited

U.S. PATENT DOCUMENTS

| | | | |
|---|---|---|---|
| 8,848,610 | B2 | 9/2014 | Miklos et al. |
| 9,198,032 | B2 | 11/2015 | Serravalle |
| 2003/0204599 | A1 | 10/2003 | Trossen et al. |
| 2003/0212764 | A1 | 11/2003 | Trossen et al. |
| 2006/0056351 | A1 | 3/2006 | Wall |
| 2008/0225798 | A1 | 9/2008 | Trossen |
| 2010/0020709 | A1 | 1/2010 | Ohm et al. |
| 2010/0061301 | A1 | 3/2010 | Antal et al. |
| 2010/0208653 | A1 | 8/2010 | Morinaga et al. |
| 2013/0090087 | A1* | 4/2013 | Kroeselberg ........ H04L 63/0407 455/411 |
| 2013/0260810 | A1 | 10/2013 | Rayavarapu |
| 2013/0287012 | A1 | 10/2013 | Pragada et al. |

FOREIGN PATENT DOCUMENTS

| | | |
|---|---|---|
| EP | 2007098 A1 | 12/2008 |
| EP | 2403186 A1 | 1/2012 |
| WO | 0106732 A1 | 1/2001 |
| WO | WO2011/116821 * | 9/2011 |
| WO | 2014008955 A1 | 1/2014 |
| WO | 2014008957 A1 | 1/2014 |

OTHER PUBLICATIONS

3GPP, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11)", 3GPP TS 48.018 V11.0.0, Sep. 2012, 1-185.

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.1.0, Sep. 2012, 1-262.

3GPP, "3rd Generation Partnership Project; Technical Specification Group Radio Access Network; UTRAN Iu interface Radio Access Network Application Part (RANAP) signalling (Release 11)", 3GPP TS 25.413 V11.1.0, Sep. 2012, 1-430.

3GPP, "3rd Generation Partnership Project; Technical Specification Group Services and System Aspects; IP Multimedia Subsystem (IMS) Service Continuity; Stage 2 (Release 12)", 3GPP TS 23.237 V12.0.0, Jun. 2012, 1-167.

* cited by examiner

APPLICATION SERVICE PLATFORM WITH ACCESS TO CORE NETWORK INFORMATION

TECHNICAL FIELD

The present invention relates to methods for providing an application service in a telecommunications network and to corresponding devices. The methods and devices may for example be used for enabling distributed radio access network (RAN) clouds in smart mobile broadband networks.

BACKGROUND

In telecommunications networks, e.g., as specified by 3GPP ($3^{rd}$ Generation Partnership Project), it is known to provide application services to users of the telecommunications network. Examples of such application services are Internet Protocol (IP) based multimedia services. One possibility is to provide the application services by application servers in a core network (CN) of the telecommunications network. A further possibility is to add an application service (AS) platform at nodes of an access network of the telecommunications network. Examples of such access nodes are nodes of a RAN of a cellular mobile telecommunications system, such as a Radio Network Controller (RNC) of the UMTS (Universal Mobile Telecommunications System) Terrestrial Radio Access Network (UTRAN) or a base station of the evolved UTRAN (E-UTRAN) according to 3GPP LTE (Long Term Evolution), referred to as E-UTRAN Node B (eNB). Such AS platform may be implemented as an open Information Technology (IT) platform which can host applications provided by the operator of the telecommunications network and also applications provided by other parties.

In a typical scenario, a user equipment (UE) connected to the telecommunications network via a given access node would access an application running on the AS platform at this access node. The AS platform could then expose useful information available at the access node to the application, e.g., information on radio channel characteristics, UE identifiers, or the like.

Since the telecommunications network is typically equipped with a plurality of access nodes, also a plurality of AS platforms may be provided. Such plurality of AS platforms may be used for providing application services in a cloud infrastructure.

Cloud computing may be defined as the provision of computing and/or storage capacity as a service to a heterogeneous community of end-recipients. It may allow access to fully featured applications, to software development and deployment environments, and to computing infrastructure assets such as network-accessible data storage and processing. A cloud computing system may be deployed privately or hosted on the premises of a cloud customer.

When using the above concept providing application services in a cloud infrastructure, network resources of the telecommunications network may be integrated with the cloud infrastructure. The possibility of using so-called carrier grade networks enables the deployment of highly demanding applications in the cloud, e.g. by providing guaranteed response times, security measures and the like. Such cloud services are also denoted as "carrier cloud", see for example http://en.wikipedia.org/wiki/Carrier_Cloud. They may be distributed over several nodes of the provider network, and may also access further services or resources outside the provider network.

However, in such a system, information required for providing an application service, such as information on a UE requesting such service, may also be distributed over several network nodes. Accordingly, in the case of an AS platform at an access node, information as typically available at the access node can be exposed to applications running on the AS platform, but access to other information may be limited.

Accordingly, there is a need for techniques which allow for providing an AS platform at an access node with enhanced access to information which can be exposed to applications running on the AS platform.

SUMMARY

According to an embodiment of the invention, a method of providing an application service in a telecommunications network is provided. The telecommunications network is accessible to a UE via an access node connected to a gateway node. According to the method, an AS platform is provided at the access node. The AS platform is for supporting one or more application services which are accessible to the UE via the access node. An association is created between first context data of the UE as available in the access node and second context data of the UE as available in the gateway node. Information from the first context data and the second context data are provided to the AS platform. The gateway node may be co-located with the access node.

According to a further embodiment of the invention, a network node is provided. The network node comprises an access node for providing access of a UE to a telecommunications network. The access node is connected to a gateway node. Further, the network node comprises an AS platform for supporting one or more application services which are accessible to the UE via the access node. The network node is configured to create an association between first context data of the UE as available in the access node and second context data of the UE as available in the gateway node, and to provide information from the first context data and the second context data to the AS platform. The network node may also comprise the gateway node.

According to a further embodiment of the invention, a telecommunications is provided. The telecommunications network comprises an access node for providing access of a UE to the telecommunications network, an AS platform at the access node for supporting one or more application services which are accessible to the UE via the access node, and a gateway node connected to the access node. At least one of the access node and the gateway node is configured to create an association between first context data of the UE as available in the access node and second context data of the UE as available in the gateway node, and to provide information from the first context data and the second context data to the AS platform.

According to a further embodiment of the invention, a computer program product is provided. The computer program product comprises program code to be executed by a processor of a network node, thereby configuring the network node to operate in accordance with the above method.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings.

DETAILED DESCRIPTION OF EMBODIMENTS

In the following, the invention will be explained in more detail by referring to exemplary embodiments and to the accompanying drawings. The illustrated embodiments relate to concepts of providing an application service in a telecommunications network. The concepts may be used for providing a distributed cloud in a RAN, for example the RAN of a cellular mobile telecommunications network. For this purpose corresponding systems, methods, and network nodes may be implemented. In the illustrated embodiments, the telecommunications network implements cellular radio access technology, such as Wideband Code Division Multiple Access (WCDMA), UMTS, or LTE. However, it is to be understood that the illustrated concepts could also be implemented in other types of telecommunications network.

According to some aspects, the concepts may be used to provide methods, systems and network nodes by which distributed cloud services in a telecommunications network can be provided.

According to some aspects, such method of providing services to a UE in a telecommunications network involves that the UE obtains access to the telecommunications network via an access node, that the access node is further connected to at least one gateway node, and that an association is created between the UE context data available in the access node and the UE context data available at the least one gateway node.

According to some aspects, the information available from the associated UE context data may be provided to an AS platform providing one or more application services to the UE and/or serving as a middleware platform for applications providing services to the UE.

According to some aspects, a telecommunications network comprises an access node and at least one gateway node, the access node being adapted to provide access to the telecommunications network for at least one UE. The access node and/or the at least one gateway node are adapted to create an association between the UE context data available in the access node and the UE context data available at the at least one gateway node.

The telecommunications network may further comprise an AS platform, which may be adapted to provide application services to the UE and/or to serve as a middleware platform for applications providing services to the at least one UE, the AS platform being adapted to receive information available from the associated UE context data from the access node and/or the at least one gateway node. The AS platform may be comprised in or connected to the access node and/or the at least one gateway node.

It may also be provided that the access node and the at least one gateway node are co-located, e.g., by deploying both in the same site.

According to some aspects, a network node of a telecommunications network is adapted to provide services to a UE. The network node is further adapted to create an association of UE context data available in the network node with a UE context data available in a further network node. The network node may be or comprise an access node of the telecommunications network, and the further network node may be or comprise a gateway node of the telecommunications network, or vice versa.

The network node may further comprise an AS platform, which may be adapted to provide services to the UE and/or to serve as a middleware platform for applications providing services to the at least one UE, wherein the application services platform is adapted to receive information available from the associated UE context data from the network node and/or the further network node.

In the above aspects, the telecommunications network may be a mobile telecommunications network, e.g. a Public Land Mobile Network (PLMN), and the access node may be a radio base station of the mobile telecommunications network. In some scenarios, the mobile telecommunications network may be based on UMTS/WCDMA, and the access node may be a NodeB or a combined NodeB and RNC. Further, the mobile telecommunications network may be based on LTE, and the access node may be an eNB. In such LTE scenario the at least one gateway node may for example be a Serving Gateway (SGW) and/or a Packet Data Network Gateway (PGW). In such LTE scenario, and in conjunction with the method, system or network nodes described above, the eNB may be co-located with the SGW and/or PGW, and an association between the UE context data in the eNB and the UE context data in the S-GW and/or PGW may be created. Once this association is created, the information in the UE context data in the SGW and/or PGW can be exposed to an AS services platform, e.g., an open IT platform.

By features according to the above aspects, it is possible to make various information available between network entities. Such information may be required or useful for providing certain services to a UE. For example, RAN related information may per se be available in an access node, e.g., an eNB, and can be exposed to an AS platform, e.g., an open IT platform in the eNB site. On the other hand, CN related information is typically not per se available in the eNB. By creating the association between UE context data available at the access node and UE context data available at the gateway node, both RAN and CN information can efficiently be made available in the access node, e.g., an eNB. Thereby, local applications residing in an access site (to which the access node belongs) can obtain this information which may be required or helpful to provide the services.

Figure 1:
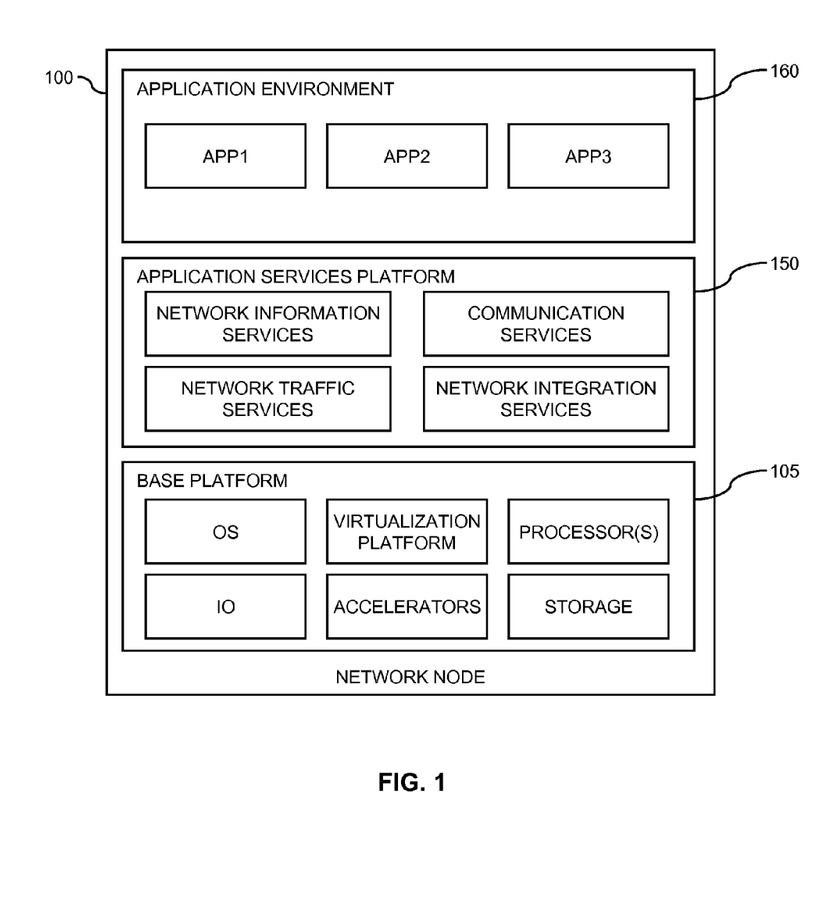
FIG. 1 schematically illustrates a network node according to an embodiment of the invention.

FIG. 1 schematically illustrates a network node 100 according to an embodiment of the invention. As further explained below, the network node 100 may be a node of a RAN of the telecommunications network. In particular, the node may implement an access node in the form of a base station, e.g., an eNB, or a controller of a base station, e.g., an RNC. In the illustrated example, the network node 100 is provided with a base platform 105. The base platform 105 comprises hardware and software structures as required for implementing typical functionalities of the access node. As illustrated in FIG. 1, such hardware structures may include one or more processors, e.g., in the form of a Central Processing Unit and/or a set of special purpose processors. Further, such hardware structures may include a storage, e.g., in the form of a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The storage may store program code to be executed by the processor(s), e.g., for implementing the software structures, and/or other data. Still further, such hardware structures may include one or more accelerators, e.g., for supporting certain computation tasks such as coding or decoding, and Input/Output (IO) device(s), e.g., interfaces, receivers, or transmitters. The software structures may include an operating system (OS). Further, the base platform 105 may include a virtualization platform which may be implemented by software structures, but may also be supported by hardware structures.

In addition, the network node 100 includes an AS platform 150 for providing one or more application services to one or more UEs connected to the telecommunications network. The AS platform 150 may be implemented by software structures utilizing hardware and/or software structures of the base platform 105. The AS platform 150 in turn may support an application environment 160 for hosting one or more applications (in the illustrated example shown as APP1, APP2, APP3). Each application may be designed for providing a corresponding application service to the UEs. The applications may be provided by the operator of the telecommunications network and/or by some other party. The AS platform 150 may also connect to other network nodes or external nodes, e.g., for network management and control.

As can be seen, the AS platform 150 is integrated in the network node 100 to provide application services at the network node 100. In this way, network and/or processing load for providing the application services may be efficiently distributed in the telecommunications network.

The AS platform 150 may be regarded as a middleware between the base platform 105 and the applications running in the application environment. The AS platform 150 may provide functionalities such as basic communication methods and control mechanisms, e.g., allowing the application services to communicate with each other, with other external applications, and/or with other functionalities implemented by the hardware and/or software structures of the network node 100. In the example of FIG. 1, the functionalities provided by the AS platform 150 are referred to as network information services (NIS), network traffic services, network integration services, and communication services. The network traffic services functionality may for example provide routing and priority of UE traffic streams between the access node and one or more applications running on the AS platform 150, or between the access node and Internet. The network integration services may provide interfaces to existing CN functionality relating to, e.g., policy control, charging and lawful/legal interception. Network traffic services and network integration services may be provided for example by functionalities which are similar to those as typically implemented by a user plane gateway. The communication services may provide functionalities used for communications between applications running on the AS platform 150 and other of the functionalities of the AS platform 150.

The functionality referred to as NIS has the purpose of exposing information about the network node 100 and its connected UEs to the applications running in the application environment 160. The information about the network node 100 may for example include a number of connected UEs, e.g., as identified by a Radio Resource Control (RRC) functionality of the network node 100, an average of transmit powers controlled by the network node 100, an average throughput of a cell controlled by the network node 100, an average delay of packets buffered by the network node 100, an average High Speed (HS) code utilization, e.g., average utilization of High Speed Packet Access (HSPA) channelization codes, or the like. Such information about a UE may include an identifier of the UE, e.g., an International Mobile Subscriber Identity (IMSI) associated with the UE, a Mobile Station International Subscriber Directory Number (MSISDN) associated with the UE, a Temporary Mobile Subscriber Identity (TMSI) associated with the UE, a Global Unique Temporary Identity (GUTI) of the UE, an International Mobile Equipment Identity (IMEI) of the UE, or a Radio Network Temporary Identity (RNTI) assigned to the UE. Further, such information about a UE may include radio channel information such as a RRC State indication for the UE, a serving cell or neighboring cell Reference Signal Received Power (RSRP) or Reference Signal Received Quality (RSRQ) or signal to noise and/or interference measure like Ec/No (Chip energy to Noise spectral density) ratio measured by the UE, a Channel Quality Indicator (CQI) determined by the UE, a transmit power of the UE, or the like. The information may be divided into RAN information as typically available at an access node, e.g., an eNB or an RNC, and CN information as typically available at CN nodes of the telecommunications network, e.g., at a gateway node. The RAN information may include the GUTI, TMSI, RNTI, RRC state indication, serving cell RSRP/RSRQ, neighboring cell RSRP/RSRQ, Ec/No ratio, transmit powers, average transmit powers, CQI, cell throughput, or the like. The CN information may include the IMSI, IMEI, MSISDN, UE IP address(es), information on activated bearers and related Traffic Flow Template (TFT) and/or Quality of Service (QoS) parameters or the like.

By providing multiple network nodes with a structure as illustrated in FIG. 1, a distributed cloud computing infrastructure in the RAN of the telecommunications network may be implemented, thereby combining traditional cloud computing with access to additional RAN-specific services, e.g., through specific APIs, with applications running close to or within the RAN cloud. When third party applications are being run inside the distributed cloud, they can get access to high speed, low latency RAN APIs that may use information in the RAN.

The distributed RAN cloud may be viewed as an advanced hosting platform or open IT platform that offers more possibilities than conventional cloud solutions. The distributed RAN cloud may offer local processing, local storage, and high speed access to APIs providing services from the RAN.

Figure 2:
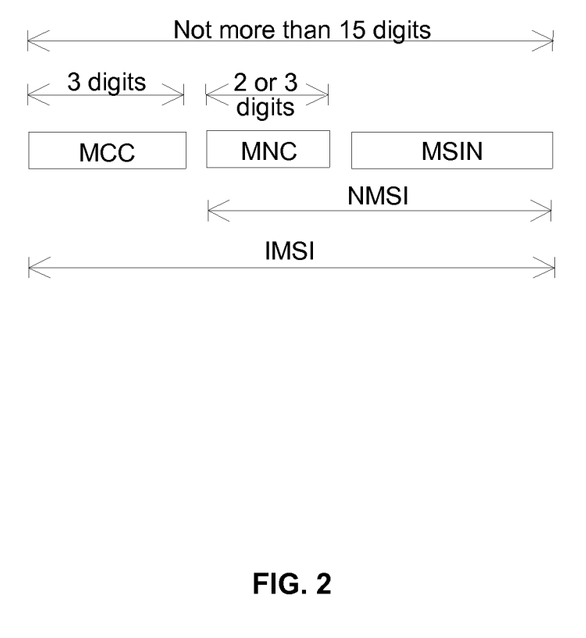
FIG. 2 illustrates a UE identifier which may be included in UE context data handled in accordance with an embodiment of the invention.

Various permanent UE identifiers are defined in 3GPP Technical Specification (TS) 23.003. As an example, the definition of the IMSI is shown in FIG. 2. As illustrated, the IMSI is composed of three parts: (1) Mobile Country Code (MCC) consisting of three digits. The MCC identifies uniquely identifies the country of the mobile subscriber. (2) Mobile Network Code (MNC) consisting of two or three digits. The MNC identifies the home PLMN of the mobile subscriber. The length of the MNC, which is two or three digits, depends on the value of the MCC. (3) Mobile Subscriber Identification Number (MSIN) identifying the mobile subscriber within a PLMN. The National Mobile Subscriber Identity (NMSI) consists of the MNC and the MSIN.

In 3GPP TS 23.003, also the International Mobile station Equipment Identity and Software Version number (IMEISV), the IMEI, and the MSISDN are defined.

In the Evolved Packet System (EPS) of LTE, the permanent identities are typically only known in the CN, also referred to as Evolved Packet Core (EPC), and the E-UTRAN is typically only aware of temporary UE identities. An example of such temporary UE identity is the GUTI that uniquely identifies the MME (Mobility Management Entity) which allocated the GUTI and also identifies the UE within the MME that allocated the GUTI. Another example of such temporary UE identity is the S-TMSI, which is used for paging purposes. GUTI and S-TMSI are also defined in 3GPP TS 23.003. The GUTI is allocated to the UE during the Attach procedure as defined in 3GPP TS 23.401 and the serving MME holds the association between the GUTI and the UE permanent identifier(s).

The NIS functionality may aggregate such information and make the information available to the applications running in the application environment, e.g., through an Application Programming Interface to facilitate usage of the information by applications from various parties. Such API could also be provided by a specific API aggregation application running in the application environment.

One example of the above applications that may be realized on the basis of the AS platform 150 and utilizes the information provided by the network information services functionality is a Transport Control Protocol (TCP) proxy that changes the TCP congestion window as a function of the radio network information it gets via the NIS functionality (or via an API aggregation application).

Figure 3:
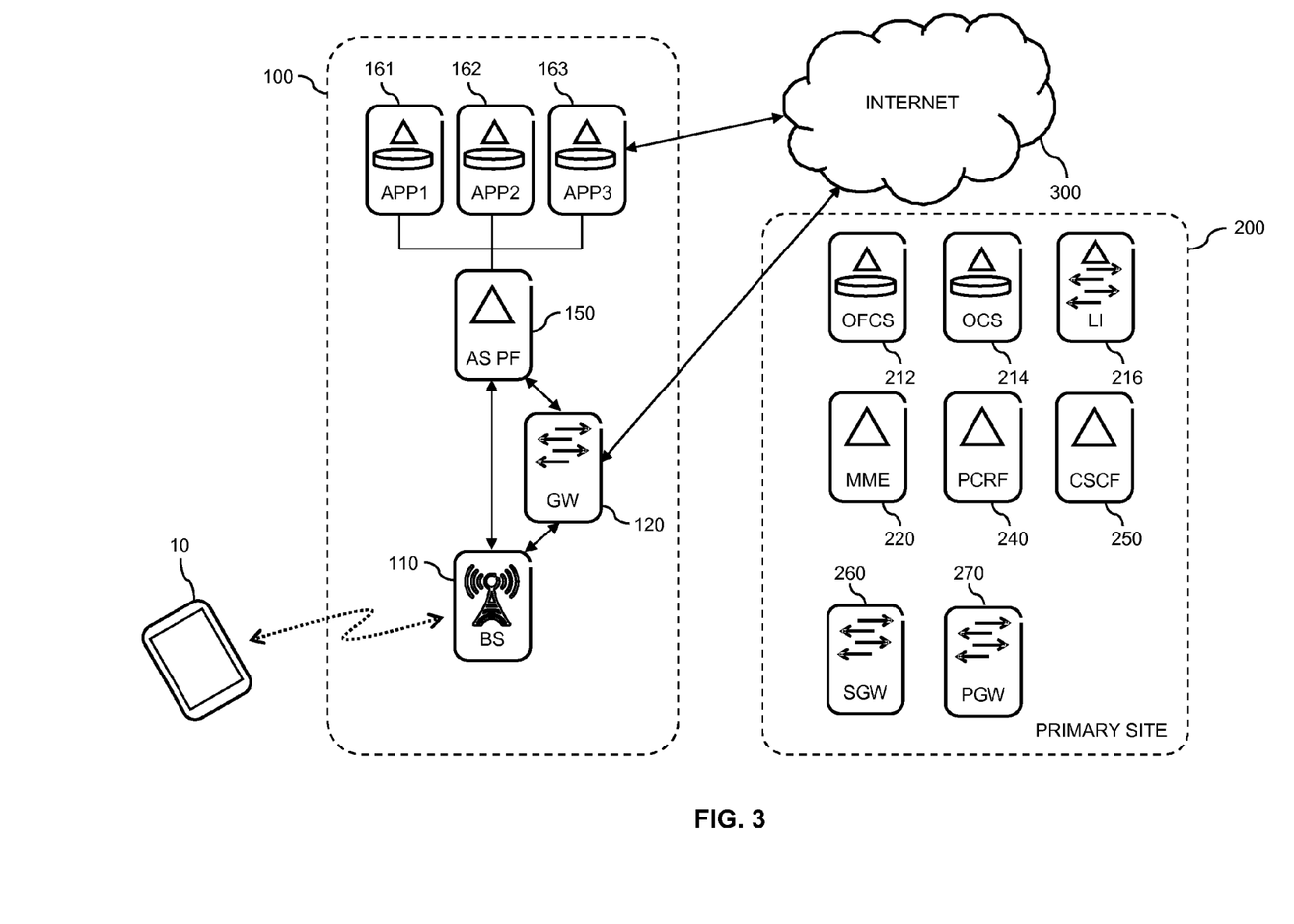
FIG. 3 schematically illustrates an implementation in which an AS platform is provided at a base station of a mobile telecommunications network.

An exemplary implementation of the AS platform at a 3GPP LTE base station (BS), i.e., an eNB, is further illustrated in FIG. 3. In this implementation, a network node 100 includes the BS 110 and the AS platform (AS PF) 150. By way of example, applications 161, 162, 163 are illustrated as being implemented on the basis of the AS platform 150. Further, the network node 100 also includes a gateway node (GW) 120 for carrying user plane data between the UE 10 and the Internet 300. In accordance with the illustrated LTE scenario, the gateway node 120 may implement an SGW and PGW. The network node 100 may be implemented on the basis of a common base platform 105 as illustrated in FIG. 1 and/or on the basis of multiple co-located devices. For example, a device implementing the BS 110 and the AS platform 150 could be co-located with a further device implementing the gateway node 120, or a device implementing the BS 110 could be co-located with a further device implementing the gateway node 120 and the AS platform 150. In the following, co-location of certain nodes is considered to cover both implementation of the nodes in the same device, e.g., on the basis of a common base platform as illustrated in FIG. 1, and implementation of the nodes in different but co-located devices. In the example of FIG. 3, the AS platform 150 is placed, in terms of network hierarchy, above the interface between the PGW and the Internet 300, referred to as SGi interface. This means that the SGW and PGW are placed below the AS platform 150. The SGW and PGW may also be referred to as user plane gateways.

The network node 100 of FIG. 3 is located at an access site, i.e., at a location of the BS 110. Further, FIG. 3 illustrates exemplary CN nodes which are located at a primary site 200 of the telecommunications network, namely an Offline Charging System (OFCS) node 212, an Online Charging System (OCS) node 214, a Legal Interception (LI) node 216, a Mobility Management Entity (MME) 220, a Policy and Charging Rules Function (PCRF) 240, a Call Session Control Function (CSCF) 250, a central SGW 260, and a central PGW 270. The primary site 200 may correspond to a central switching site. At such central switching site for example peering points for connecting to the Internet 300 may be located.

In the implementation of FIG. 3, co-locating the gateway node 120 with the BS 110 and the AS platform 150 allows for efficiently using the gateway node 130 as a decision point for selectively directing user plane data of the UE 10 to the AS platform 150 or to the Internet 300 or to services provided at the primary site 200. Further, mechanisms of the gateway node 120 can be utilized for applying charging, policy and/or QoS control, and/or lawful interception also to the user plane data between the UE 10 and the AS service platform 150. Directing data traffic to the Internet 300 or to services provided at the primary site 200 may occur through intermediate sites, e.g., through an aggregation site, a local switching site, and/or a routing site (not illustrated in FIG. 3).

Figure 4:
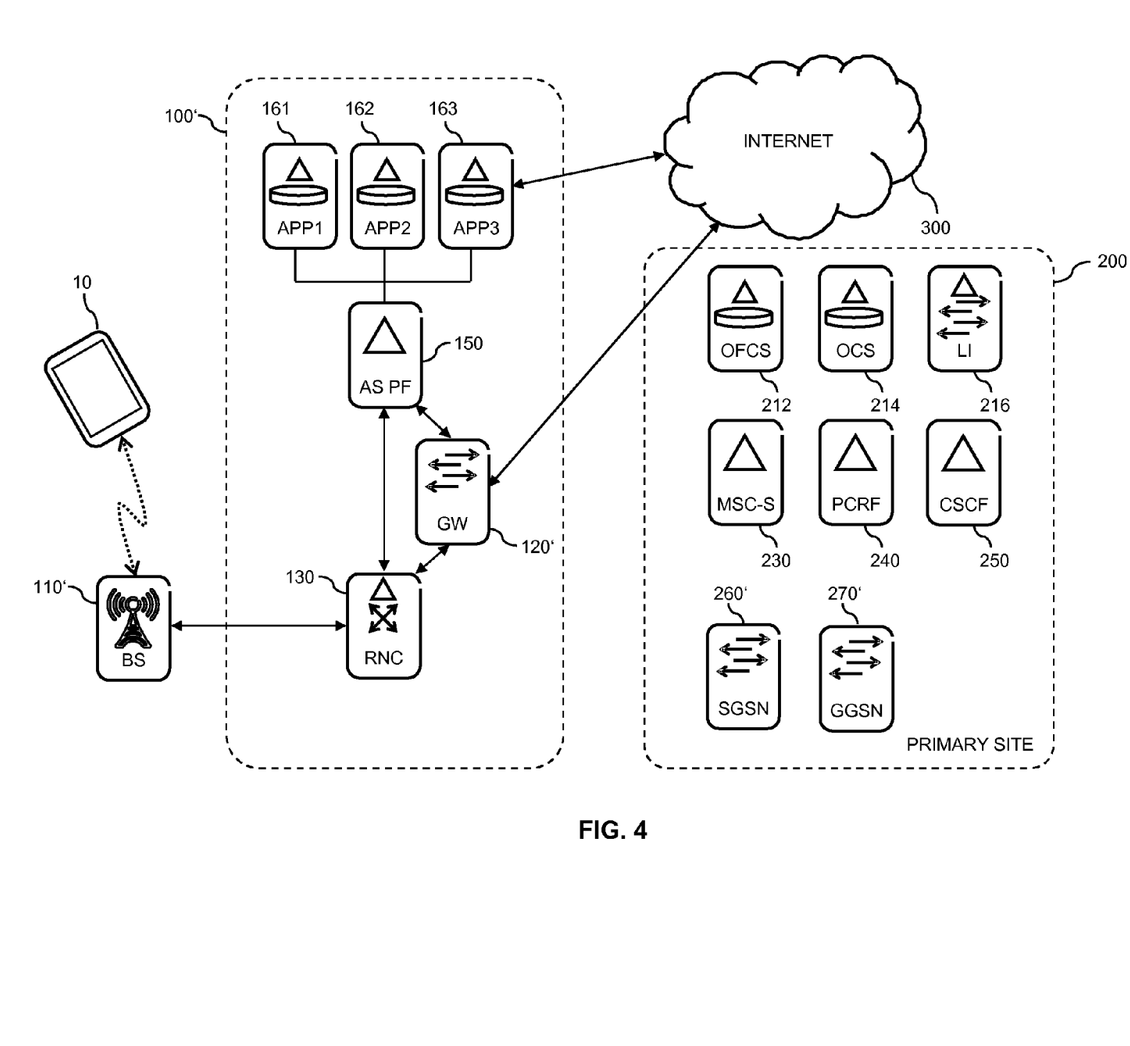
FIG. 4 schematically illustrates an implementation in which an AS platform is provided at a controller of a base station of a mobile telecommunications network.

FIG. 4 illustrates an exemplary implementation of the AS platform at a radio network controller (RNC), e.g., at an RNC in a UTRAN or a Base Station Controller (BSC) in a Global System for Mobile Communications Radio Access Network (GERAN) supporting General Packet Radio Service (GPRS). In this implementation, a network node 100' includes the RNC 130 and the AS platform 150. By way of example, applications 161, 162, 163 are illustrated as being implemented on the basis of the AS platform 150. Further, the network node 100' also includes a gateway node (GW) 120' for carrying user plane data between the UE 10 and the Internet 300. In this scenario, the gateway node 120' may implement a Serving GPRS Support Node (SGSN) and Gateway GPRS Support Node (GGSN). The network node 100' may be implemented on the basis of a common base platform 105 as illustrated in FIG. 1 and/or on the basis of multiple co-located devices. For example, a device implementing the RNC 130 and the AS platform 150 could be co-located with a further device implementing the gateway node 120', or a device implementing the RNC 130 could be co-located with a further device implementing the gateway node 120' and the AS platform 150. In some implementations, also the BS 110' could be co-located with the network node 100', e.g., when assuming an architecture with combined BS 110' and RNC 130, such as in GPRS with High Speed Packet Access (HSPA).

The network node 100' of FIG. 4 is located at a local switching site, i.e., at a location of the RNC 130, or at the location of the BS 110', i.e., at the access site. Further, FIG. 4 illustrates exemplary CN nodes which are located at a primary site 200 of the telecommunications network, namely an OFCS node 212, an OCS node 214, an LI node 216, a Mobile Switching Center Server (MSC-S) 230, a PCRF 240, a CSCF 250, a central SGSN 260', and a central GGSN 270'. The primary site 200 may correspond to a central switching site. At such central switching site for example peering points for connecting to the Internet 300 may be located.

In the implementation of FIG. 4, co-locating the gateway node 120' with the RNC 130 and the AS platform 150 allows for efficiently using the gateway node 120' as a decision point for selectively directing data traffic of the UE 10 to the AS platform 150 or to the Internet 300 or to services provided at the primary site 200. Further, mechanisms of the gateway node 120' can be utilized for applying charging, policy and/or QoS control, and/or lawful interception also to the data traffic between the UE 10 and the AS service platform 150. Directing data traffic to the Internet 300 or to services provided at the primary site 200 may occur through intermediate sites, e.g., through an aggregation site, a local switching site, and/or a routing site (not illustrated in FIG. 4).

In the implementations of FIGS. 3 and 4, the UE 10 may use an application service provided by one of the applications 161, 162, 163. The user plane data would then be routed to the AS platform 150 and to the corresponding application 161, 162, 163. This application 161, 162, 163 may in turn access the Internet 300 as needed. Through the AS platform 150, in particular through a NIS functionality as mentioned above, the application may also obtain information on the UE 10 as available from UE context data at the BS 110 or at the RNC 130, e.g., GUTI, RNTI, RRC State indication, serving cell RSRP/RSRQ, neighboring cell RSRP/RSRQ or Ec/No ratio, CQI, UE transmit power, or the like. Such information will in the following also be referred to as UE context data of the access node. As used herein, the UE context data of the access node include information related to the UE which are available at the access node. The UE context data may vary from one access node to the other. The UE context data of the access node is typically radio related and may include temporary identifiers such as GUTI or RNTI.

In addition, the application may also obtain information on the access node itself, i.e., on the BS 110 or the RNC 130. Such information may include a number of connected UEs, an average transmit power, an average cell throughput, an average delay of buffered packets, and/or an average HS code utilization as mentioned above.

UE context data may also be available at other nodes, e.g., at the gateway nodes 120, 120'. UE context data of such gateway nodes is typically related to a subscription of the UE and may include permanent identifiers such as IMSI, IMEI, or MSISDN. Such information may in turn allow for obtaining further information related to the UE 10, as available through nodes of the CN or other nodes coupled to the gateway node 120, 120'.

For efficiently making the CN information available to an AS platform at an access node, e.g., AS platform 150 at the BS 110 or RNC 130, the illustrated concepts involve creating an association between UE context data of the access node and UE context data of a gateway node connected to the access node, e.g., the gateway node 120 or of the gateway node 120'. As mentioned above, the access node and the gateway node may be co-located. The UE context data of the access node may include a temporary identifier of the UE, e.g., a GUTI or a TMSI. The UE context data of the access node may also include radio link data of the UE, e.g., RRC state indication, serving cell RSRP/RSRQ, neighboring cell RSRP/RSRQ, Ec/No ratio, transmit power, or the like. The UE context data of the gateway node may in turn include a permanent identifier of the UE, e.g., the IMSI, MSISDN, or IMEI. The UE context data of the gateway node may also include data on bearers established by the UE and/or QoS parameters applicable for the UE, e.g., information on active bearers and corresponding TFT or QoS parameters.

In the implementations of FIGS. 3 and 4, the AS platform 150 may be used for providing an execution environment for applications that benefit from a location closer to the end-user. In some scenarios, the AS platform 150 may implement an open IT platform which may be used for running applications provided by various parties.

As mentioned above, the gateway node 120, 120' may be used as a decision point for selectively directing data traffic of the UE 10 to the AS platform 150 or to the Internet 300, e.g., for implementing a breakout functionality to a RAN cloud implemented by the AS platform 150. In such a case, distributed support may be provided for lawful interception, charging, policy and/or QoS control, session continuity, or mobility based on existing and deployed 3GPP mechanisms. The gateway node 120 may provide the functionalities of the SGW and/or PGW as specified by 3GPP. Further, it supports exposure of information as typically available in the CN. The gateway node 120, 120' may be controlled using existing 3GPP and CN mechanisms. Furthermore, the breakout functionality of the gateway node 120, 120' may also provide the possibility to let the applications on the AS platform access user data. Selected parts of the user data can be routed to these applications while other parts of the user data can be routed towards the primary site and further to the Internet 300.

The implementations of FIGS. 3 and 4 may also be combined, e.g., by supplementing the network node 100 of FIG. 3 with a BS 110' and RNC 130 as illustrated in FIG. 4. In this case, the network node could be further equipped with a 3G breakout functionality, e.g., implemented together with the RNC 130. The 3G breakout functionality may be used for routing WCDMA/HSPA user plane data to the SGW and PGW implemented by the gateway node 120.

It should be noted that the co-location of the gateway node 120, 120' with the AS platform 150 and access node 110, 130 is optional and that the association between the UE context data in the access node and the UE context data in the gateway node may be used to provide the AS platform with CN information, without co-locating gateway node 120, 120' with the AS platform 150 and access node 110, 130. In such a scenario, user plane data may be delivered from the access node to the external gateway node 120, 120' and then to the AS platform 150. Also, in some cases, applications may exist that are not necessarily user plane based. Then, it may be sufficient if the gateway node 120, 120' and the AS platform share the CN information.

Figure 5:
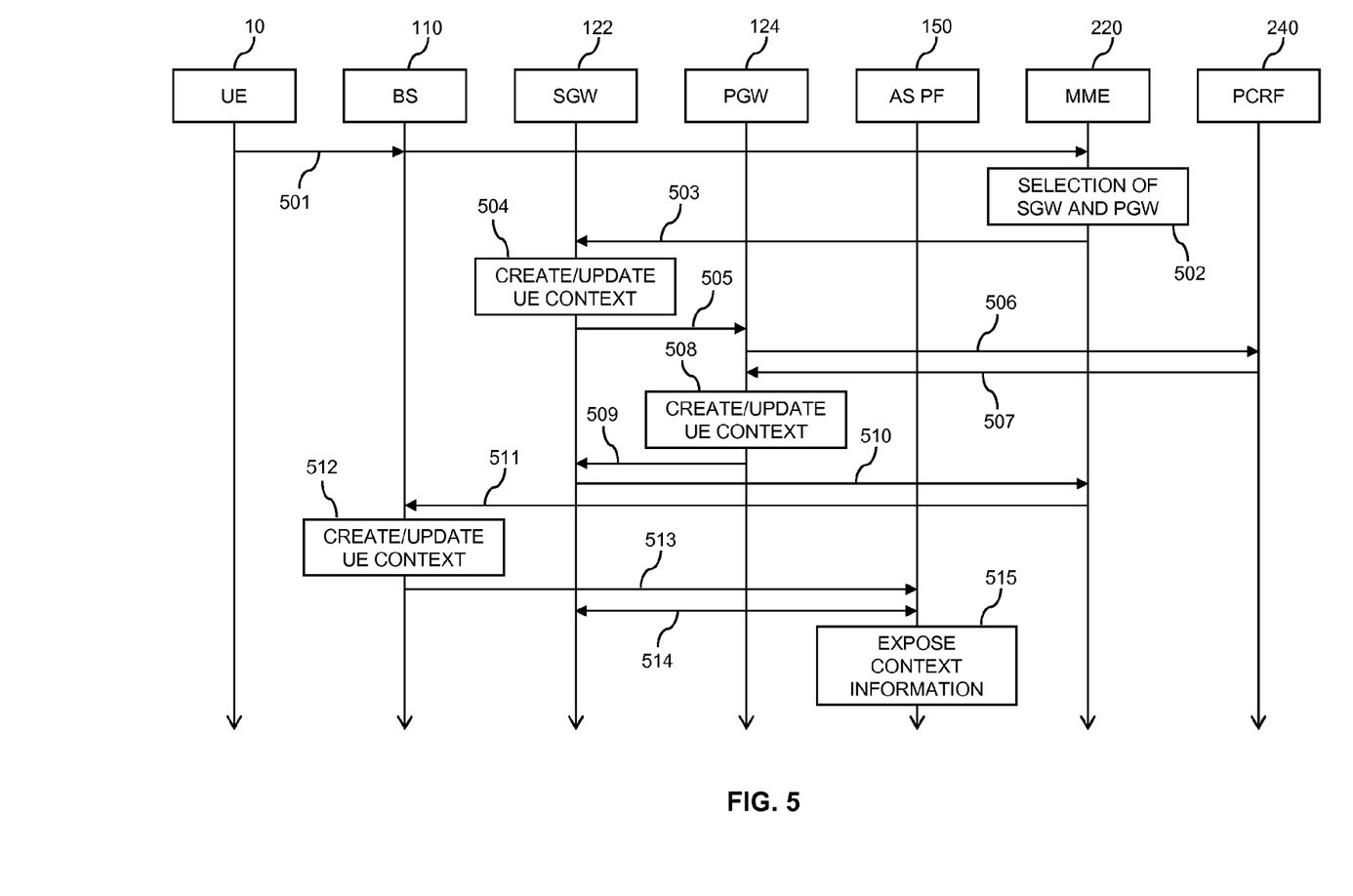
FIG. 5 shows a signalling diagram for illustrating procedures in accordance with an embodiment of the invention.

FIG. 5 shows a signalling diagram for illustrating exemplary procedures which may be used for implementing the above concepts in connection with establishment or modification of a connection between the UE 10 and the telecommunications network. The procedures involve the UE 10, the BS 110, the SGW 122, the PGW 124, the AS platform 150, the MME 220, and the PCRF 240.

By sending message 501 via the BS 110 to the MME 220, the UE 10 may for example trigger a Non Access Stratum (NAS) Attach procedure or some other procedure for establishing or modifying a connection between the UE 10 and the telecommunications network, e.g., any procedure in which a bearer for the UE 10 is created or is modified. It is noted that it is not necessary that such procedures are initiated by the UE 10, but could also be initiated by some network node. The message 501 may be a UE Attach Request.

At step 502, the MME 220 may select the SGW 122 and PGW 124 as user plane gateways for the connection between the UE 10 and the telecommunications network.

The MME 220 may then send message 503 to the SGW 122 to request creation of a session. Message 503 may be a Create Session Request of the control plane GPRS Tunnel Protocol (GTP-C). Message 503 may contain CN information related to the UE 10, e.g., UE context data available in the CN such as IMSI, IMEI and/or MSISDN.

At step 504, the SGW 122 may create or updates a context of the UE 10 at the SGW 122. This may involve storing the CN information received from the MME 220.

The SGW 122 may then send message 505 to the PGW 124 to request creation of a session. Message 505 may include the CN information received from the MME 220. Message 505 may be a GTP-C Create Session Request.

The PGW 124 may then send message 506 to the PCRF 240 to request QoS rules and other information. Message 506 may be a Credit Control Request (CCR) message of a Diameter based protocol implemented on the Gx interface between the PGW 124 and the PCRF 240. The PCRF 240 replies by sending message 507 to the PGW 124. Message 507 may be a Credit Control Answer (CCA) message of the Diameter based Gx interface protocol. At step 508, the PGW 124 may create or update a context of the UE 10 at the PGW 124. This may involve storing the CN information received from the MME 220 and/or from the PCRF 240. Further, the PGW 124 may allocate a user plane IP address and Tunnel Endpoint Identifier (TEID) of the PGW 124 for a GTP tunnel between the SGW 122 and the PGW 124. The GTP tunnel may be related to a bearer between the UE 10 and the telecommunications network. This user plane IP address and TEID of the PGW 124 may be stored in the UE context at the PGW 124. The UE context at the PGW 124 may also contain information that was received from the SGW 122 in message 505. In some scenarios, creation or updating of the UE context at the PGW 124 could also be accomplished in response to receiving message 505.

The PGW 124 may then send message 509 to the SGW 122. Message 509 may include the user plane IP address and TEID of the PGW 124. Message 509 may be a GTP-C Create Session Response. The SGW 122 may store the user plane IP address and TEID of the PGW 124 in the UE context at the SGW 122. In addition, the SGW 122 may allocate a user plane IP address and TEID of the SGW 122 for the GTP tunnel. This user plane IP address and TEID of the SGW 122 may be stored in the UE context at the SGW 122.

The SGW 122 may then send message 510 to the MME 220. Message 510 may be a GTP-C Create Session Response. Message 510 may include the user plane IP address and TEID of the SGW 122, as usable for identifying the SGW 122 as destination of uplink GTP transmissions.

The MME 220 may then send message 511 to the BS 110, to initiate creation or updating of a context of the UE 10 at the BS 110. Message 511 may be an Initial Context Setup Request of the S1 interface Application Protocol (S1-AP). Message 511 may include the user plane IP address and TEID of the SGW 122.

At step 512, the BS 110 may create or update the context of the UE. This may involve storing the user plane IP address and TEID of the SGW 122. In this way, an association between the UE context data at the BS 110 and the UE context data at the SGW 122 may be created. The user plane IP address and TEID of the SGW 122 may be used as a reference to the UE context at the SGW 122.

With message 513, the BS 110 may then send an indication to the AS platform 150 that a connection of the UE 10 was established or modified, e.g., that the UE 10 has attached. Message 513 may contain data from the UE context at the BS 110 and the reference to the UE context at the SGW 122, e.g., the user plane IP address and TEID of the SGW 122.

As indicated by messages 514, the AS platform 150 may then use the received reference to the UE context at the SGW 122 to retrieve data from the UE context at the SGW 122 from the SGW 122.

At step 515, the AS platform 150 may expose information from the UE context data at the BS 110 and the UE context data at the SGW 122. The AS platform 150 may also expose information which is "indexed" by the CN information in the UE context at the SGW 122, e.g., the MSISDN or IP address of the UE.

The procedures of FIG. 5 may also be extended by the AS platform 150 requesting from the SGW 122 a reference to the UE context at the PGW 124, e.g., the user plane IP address and TEID of the PGW 124. The AS platform 150 may then also contact the PGW 124 to retrieve information from the UE context at the PGW 124. Further, it should be noted that the procedures could be modified with respect to the way of conveying the UE context data of the SGW 122 to the AS platform 150. For example, rather than providing the reference to the UE context at the SGW 122 to the AS platform 150, the BS 110 could retrieve the information from the UE context data at the SGW 122 and send this information to the AS platform 150.

In the procedures of FIG. 5 the BS 110 may provide the AS platform 150 with a reference to the UE context at the SGW 122, i.e., the UE context data of the access node as provided to the AS platform include a reference to the UE context data at the gateway node, which reference may be used by the AS platform to obtain the UE context data at the gateway node. In other scenarios, the SGW 122 may provide the AS platform 150 with a reference to the UE context at the BS 110, i.e., the UE context data of the gateway node as provided to the AS platform include a reference to the UE context data at the access node. The AS platform may then first obtain the UE context data at the gateway node and the included reference, and use this reference for obtaining information from the UE context at the access node.

Figure 6:
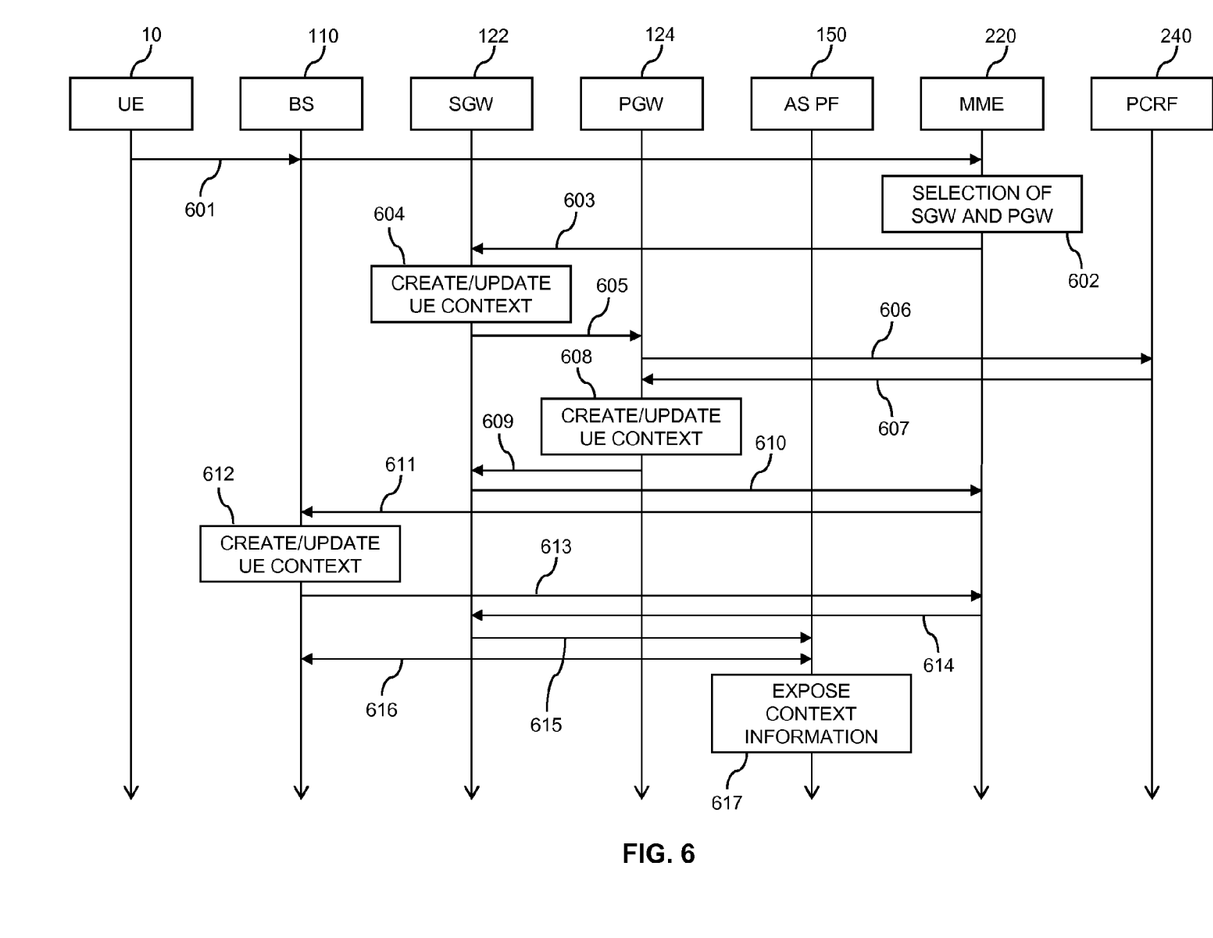
FIG. 6 shows a signalling diagram for illustrating further procedures in accordance with an embodiment of the invention.

Corresponding procedures are illustrated in FIG. 6. The procedures involve the UE 10, the BS 110, the SGW 122, the PGW 124, the AS platform 150, the MME 220, and the PCRF 240.

By sending message 601 via the BS 110 to the MME 220, the UE 10 may for example trigger a NAS Attach procedure or some other procedure for establishing or modifying a connection between the UE 10 and the telecommunications network, e.g., any procedure in which a bearer for the UE 10 is created or is modified. It is noted that it is not necessary that such procedures are initiated by the UE 10, but could also be initiated by some network node. The message 601 may be a UE Attach Request.

At step 602, the MME 220 may select the SGW 122 and PGW 124 as user plane gateways for the connection between the UE 10 and the telecommunications network.

The MME 220 may then send message 603 to the SGW 122 to request creation of a session. Message 603 may be a GTP-C Create Session Request. Message 603 may contain CN information related to the UE 10, e.g., UE context data available in the CN such as IMSI, IMEI and/or MSISDN.

At step 604, the SGW 122 may create or updates a context of the UE 10 at the SGW 122. This may involve storing the CN information received from the MME 220.

The SGW 122 may then send message 605 to the PGW 124 to request creation of a session. Message 605 may include the CN information received from the MME 220. Message 605 may be a GTP-C Create Session Request.

The PGW 124 may then send message 606 to the PCRF 240 to request QoS rules and other information. Message 606 may be a CCR message of a Diameter based protocol implemented on the Gx interface between the PGW 124 and the PCRF 240. The PCRF 240 replies by sending message 607 to the PGW 124. Message 607 may be a CCA message of the Diameter based Gx interface protocol.

At step 608, the PGW 124 may create or update a context of the UE 10 at the PGW 124. This may involve storing the CN information received from the MME 220 and/or the PCRF 240. Further, the PGW 124 may allocate a user plane IP address and Tunnel Endpoint Identifier (TEID) of the PGW 124 for a GTP tunnel between the SGW 122 and the PGW 124. This user plane IP address and TEID of the PGW 124 may be stored in the UE context at the PGW 124. The UE context at the PGW 124 may also contain information that was received from the SGW 122 in message 605. In some scenarios, creation or updating of the UE context at the PGW 124 could also be accomplished in response to receiving message 605.

The PGW 124 may then send message 609 to the SGW 122. Message 609 may include the user plane IP address and TEID of the PGW 124. Message 609 may be a GTP-C Create Session Response. The SGW 122 may store the user plane IP address and TEID of the PGW 124 in the UE context at the SGW 122. In addition, the SGW 122 may allocate a user plane IP address and TEID of the SGW 122 for the GTP tunnel. This user plane IP address and TEID of the SGW 122 may be stored in the UE context at the SGW 122.

The SGW 122 may then send message 610 to the MME 220. Message 610 may be a GTP-C Create Session Response. Message 610 may include the user plane IP address and TEID of the SGW 122, as usable for identifying the SGW 122 as destination of uplink GTP transmissions.

The MME 220 may then send message 611 to the BS 110, to initiate creation or updating of a context of the UE 10 at the BS 110. Message 611 may be an Initial Context Setup Request of the S1 interface Application Protocol (S1-AP). Message 611 may include the user plane IP address and TEID of the SGW 122.

At step 612, the BS 110 may create or update the context of the UE. This may involve storing the user plane IP address and TEID of the SGW 122. In this way, an association between the UE context data at the BS 110 and the UE context data at the SGW 122 may be created. The user plane IP address and TEID of the SGW 122 may be used as a reference to the UE context at the SGW 122.

The BS 110 may then send message 613 to the MME 220. Message 613 may be an S1-AP Initial Context Setup Response message. Message 613 may include a user plane IP address and TEID of the BS 110 for a bearer created in response to the request of message 611.

The MME 220 may then send message 614 to the SGW 122 to indicate the user plane IP address and TEID. Message 614 may be a GTP-C Modify Session Request. The SGW 122 may store the user plane IP address and TEID of the BS 110. In this way, an association between the UE context data at the BS 110 and the UE context data at the SGW 122 may be created. The user plane IP address and TEID of the BS 110 may be used as a reference to the UE context at the BS 110.

With message 615, the SGW 122 may then send an indication to the AS platform 150 that a connection of the UE 10 was established or modified, e.g., that the UE 10 has attached. Message 615 may contain data from the UE context at the SGW 122 and the reference to the UE context at the BS 110, e.g., the user plane IP address and TEID of the BS 110.

As indicated by messages 616, the AS platform 150 may then use the received reference to the UE context at the BS 110 to retrieve data from the UE context at the BS 110 from the BS 110.

At step 617, the AS platform 150 may expose information from the UE context data at the BS 110 and the UE context data at the SGW 122. The AS platform 150 may also expose information which is "indexed" by the CN information in the UE context at the SGW 122, e.g., the MSISDN or IP address of the UE.

Also the procedures of FIG. 6 may be extended by the AS platform 150 requesting from the SGW 122 a reference to the UE context at the PGW 124, e.g., the user plane IP address and TEID of the PGW 124. The AS platform 150 may then also contact the PGW 124 to retrieve information from the UE context at the PGW 124. Further, it should be noted that the procedures could also be modified with respect to the way of conveying the UE context data of the BS 110 to the AS platform 150. For example, rather than providing the reference to the UE context at the BS 110 to the AS platform 150, the SGW 122 could retrieve the information from the UE context data at the BS 110 and send this information to the AS platform 150.

It should be noted that in the above procedures sending and retrieving certain information may be implemented by explicitly transmitting the information or by merely sending a reference to the information, which can later be used by the other side to request the actual information.

Figure 7:
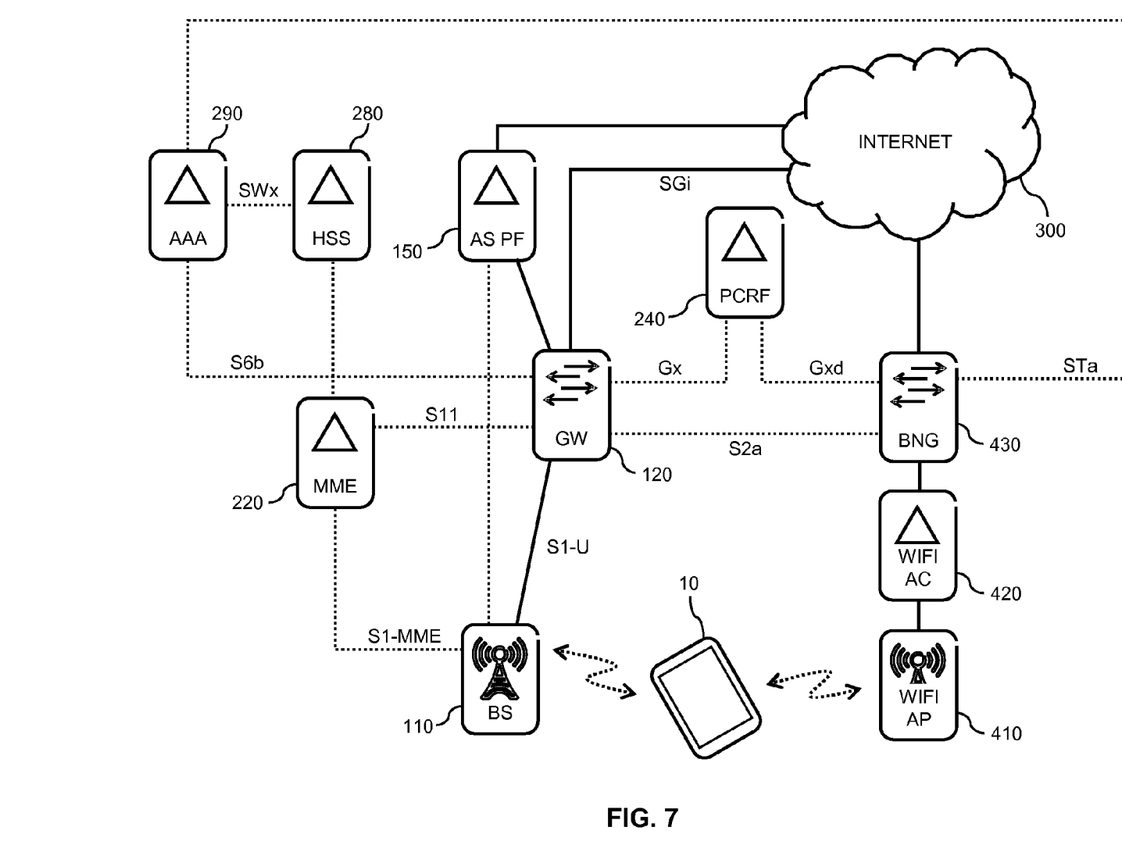
FIG. 7 schematically illustrates an example of further network nodes from which information may be provided in accordance with an embodiment of the invention.

In the above examples, the AS platform 150 is provided with information as typically available in the CN of a telecommunications network implementing one or more cellular radio access technologies, in particular WCDMA/UMTS or LTE. However, the concepts may also be applied for providing the AS platform with information available from other nodes, e.g, nodes related to other access technologies. By way of example, FIG. 7 illustrates a scenario in which the telecommunications network also includes wireless access technology on the basis of a Wireless Local Area Network (WLAN), e.g., according to IEEE 802.11, in the following also referred to as Wi-Fi access technology. In the exemplary network architecture of FIG. 7 a Wi-Fi user plane is integrated with the CN of cellular radio access technology, and also information from a context of the UE 10 at one or more nodes of the Wi-Fi access technology may be provided to the AS platform 150.

Wi-Fi integration as for example illustrated in FIG. 7 may be used for enhancing user experience. As illustrated, such integration may involve common authentication between 3GPP nodes and Wi-Fi nodes and integration of Wi-Fi user plane traffic into the CN of the cellular radio access technology. The common authentication may use automatic authentication on the basis of a Subscriber Identity Module (SIM) for both access technologies. The Wi-Fi user plane integration allows the network operator to provide the same services, like parental control or subscription based payment methods, for the end users, irrespective of being connected both via cellular radio access or via Wi-Fi access. Different solutions for Wi-Fi integration are specified in 3GPP TS 23.402.

FIG. 7 illustrates various network nodes of a 3GPP network domain, in particular nodes of the E-UTRAN and EPC such as the BS 110, the gateway node 120, the AS platform 150, the MME 220, the PCRF 240, and a Home Subscriber Server (HSS) 280, as well as nodes of a Wi-Fi access domain. In the illustrated example, the Wi-Fi access domain includes a Wi-Fi Access Point (AP) 410, a Wi-Fi Access Controller (AC) 420, and a Broadband Network Gateway (BNG) 430. Further, FIG. 7 illustrates how the BS 110 is connected to nodes of the EPC. As illustrated, the BS 110 is connected via the S1-MME interface to the MME 220 and via the S1-U interface to the gateway node 120, in particular to an SGW implemented by the gateway node 120. Further, FIG. 7 illustrates how an interface referred to as S2a connects the Wi-Fi access domain, in particular the BNG 430, to the gateway node 120, in particular to a PGW implemented by the gateway node 120. Also shown in FIG. 7 is a connection between the Wi-Fi access domain and an Authentication, Authorization, and Accounting (AAA) Server 290 of the 3GPP domain, via an interface referred to as STa. Other interfaces illustrated in FIG. 7 are the S11 interface between the MME 220 and the SGW, the SGi interface between the PGW and the Internet 300, the Gx interface between the PCRF 240 and the PGW, the Gxd interface between the PCRF 240 and the BNG 430, the S6b interface between the 3GPP AAA Server 290 and the PGW, and the SWx interface between the 3GPP AAA Server 290 and the HSS 280.

On the S2a interface, the BNG 430 and the gateway node 120, in particular the PGW implemented by the gateway node 120 communicate using GTP-C signalling. Accordingly, Create Session Request messages, Create Session Response messages, Modify Session Request messages, and Modify Session Response messages may be sent between the BNG 430 and the PGW. As explained in connection with FIGS. 5 and 6, this may result in both sides holding references to the other side's IP address and TEID for the GTP tunnel. Such reference in the PGW can be used to inform the AS platform 150 about the UE context at the BNG 430. For example, the reference could be used by the AS 150 to retrieve information from the UE context at the BNG 430.

As can be seen from the example of FIG. 7, the AS platform 150 may be provided with information from UE context data at a further node coupled to the gateway node. For this purpose, a reference to the UE context data at the further node may be included in the UE context data at the gateway node.

As can be seen, the concepts as described above may be used for efficiently providing a local AS platform at an access node with various information, in particular information as typically available at CN nodes.

It is to be understood that the examples and embodiments as explained above are merely illustrative and susceptible to various modifications. For example, the concepts could be used in connection with various types of telecommunications networks, e.g., implementing other types of radio access technologies. Also, it is to be understood that various types of access technology could be combined in the same telecommunications network, e.g., LTE access nodes and UMTS/GPRS access nodes as mentioned above.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or server farm.

Accordingly, several modifications will be apparent to and can be readily made by persons skilled in the art, without departing from the scope of the present invention. Therefore, the scope of the invention shall not be limited by the illustrations or the preferred embodiments given in the description in the form of examples.

The invention claimed is:

1. A method of providing an application service in a telecommunications network that is accessible to a user equipment via an access node connected to a gateway node, the method comprising:
    at the access node, providing an application service platform for supporting one or more application services that are accessible to the user equipment via the access node;
    creating an association between first context data of the user equipment as available in the access node and second context data of the user equipment as available in the gateway node; and
    providing information from the first context data and the second context data to the application service platform.

2. The method of claim 1, wherein the access node and the gateway node are co-located.

3. The method of claim 1, wherein the first context data comprise a temporary identifier of the user equipment.

4. The method of claim 1, wherein the first context data comprise radio link data of the user equipment.

5. The method of claim 1, wherein the second context data comprise a permanent identifier of the user equipment.

6. The method of claim 1, wherein the second context data comprise data on bearers established by the user equipment and/or quality of service parameters applicable for the user equipment.

7. The method of claim 1, wherein the second context data comprise a reference to further context data of the user equipment as available in a further node coupled to the gateway node.

8. The method of claim 7, wherein the further node is related to a wireless local area network accessible to the user equipment.

9. The method of claim 1, wherein the association between the first context data and the second context data is created by supplementing the first context data with a reference to the second context data.

10. The method of claim 9, further comprising:
    providing the application service platform with the first context data; and
    using the reference to the second context data, obtaining, at the application service platform, the second context data.

11. The method of claim 9, further comprising:
    using the reference to the second context data, obtaining, at the access node, the second context data; and
    providing, by the access node, the first context data and the second context data to the application service platform.

12. The method of claim 10, wherein the reference to the second context data comprises an Internet Protocol address of the gateway node and a Tunnel Endpoint Identifier of the gateway node in a user plane tunnel connection for the user equipment between the access node and the gateway node.

13. The method of claim 1, wherein the association between the first context data and the second context data is created by supplementing the second context data with a reference to the first context data.

14. The method of claim 13, further comprising:
    providing the application service platform with the second context data; and
    using the reference to the second context data, obtaining, at the application service platform, the first context data.

15. The method of claim 13, wherein the reference to the first context data comprises an Internet Protocol address of the access node and a Tunnel Endpoint Identifier of the access node in a user plane tunnel connection for the user equipment between the access node and the gateway node.

16. The method of claim 1, further comprising providing information about the access node to the application service platform.

17. The method of claim 1, wherein the association between the first context data and the second context data is created when establishing or modifying a connection between the user equipment and the access node.

18. A network node, comprising:
an access node configured to provide access of a user equipment to a telecommunications network, the access node being connected to a gateway node; and
an application service platform configured to support one or more application services that are accessible to the user equipment via the access node;
wherein the network node is configured to create an association between first context data of the user equipment as available in the access node and second context data of the user equipment as available in the gateway node and to provide information from the first context data and the second context data to the application service platform.

19. The network node of claim 18, wherein the network node further comprises the gateway node.

20. A telecommunications network, comprising:
an access node configured to provide access of a user equipment to a telecommunications network;
an application service platform at the access node configured to support one or more application services that are accessible to the user equipment via the access node; and
a gateway node connected to the access node;
wherein at least one of the access node and the gateway node is configured to create an association between first context data of the user equipment as available in the access node and second context data of the user equipment as available in the gateway node and to provide information from the first context data and the second context data to the application service platform.

21. A non-transitory computer-readable medium comprising, stored thereupon, a computer program product comprising program code to be executed by a processor of a network node that comprises an access node configured to provide access of a user equipment to a telecommunications network, the access node being connected to a gateway node, and further comprises an application service platform configured to support one or more application services that are accessible to the user equipment via the access node, the program comprising instructions that, when executed by the processor cause the network node to:
create an association between first context data of the user equipment as available in the access node and second context data of the user equipment as available in the gateway node; and
provide information from the first context data and the second context data to the application service platform.

* * * * *